United States Patent [19]

Hitomi et al.

[11] Patent Number: 5,318,243
[45] Date of Patent: Jun. 7, 1994

[54] SPINNING REEL HAVING A DEVICE FOR PREVENTING BACKWARD ROTATION OF A ROTOR

[75] Inventors: Yasuhiro Hitomi, Hashimoto; Noboru Sakaguchi, Tondabayashi, both of Japan

[73] Assignee: Shimano Inc., Osaka, Japan

[21] Appl. No.: 905,512

[22] Filed: Jun. 29, 1992

[30] Foreign Application Priority Data

| Jul. 3, 1991 | [JP] | Japan | 3-051187[U] |
| Oct. 16, 1991 | [JP] | Japan | 3-083569[U] |
| Oct. 16, 1991 | [JP] | Japan | 3-083570[U] |
| Jan. 31, 1992 | [JP] | Japan | 4-003094[U] |
| Feb. 18, 1992 | [JP] | Japan | 4-006391[U] |

[51] Int. Cl.$^5$ .............................. A01K 89/01
[52] U.S. Cl. .................. 242/248; 242/247; 74/576; 188/82.4
[58] Field of Search ........ 242/241, 247, 248, 107.4 R; 74/576, 577 R; 188/82.4, 82.3, 82.7, 82.77

[56] References Cited

U.S. PATENT DOCUMENTS

| 3,974,978 | 8/1976 | Henze | 188/82.4 X |
| 4,416,427 | 11/1983 | Kawai | 188/82.4 X |
| 4,474,339 | 10/1984 | Sato | 74/576 X |
| 4,770,363 | 9/1988 | Tsunoda et al. | 242/241 |
| 4,813,627 | 3/1989 | Nelson | 242/107.4 R X |
| 4,832,279 | 5/1989 | Maruyama | 242/247 |
| 4,881,699 | 11/1989 | Emura | 242/248 |

FOREIGN PATENT DOCUMENTS

| 58-22538 | 5/1983 | Japan . |
| 63-64 | 1/1988 | Japan . |
| 1-101362 | 7/1989 | Japan . |
| 2254534 | 10/1992 | United Kingdom . |

*Primary Examiner*—Clifford D. Crowder
*Assistant Examiner*—John J. Calvert
*Attorney, Agent, or Firm*—Dickstein, Shapiro & Morin

[57] ABSTRACT

A spinning reel includes a rotor rotatable relative to a reel body and supporting a bail. The rotor defines a plurality of teeth on an inner peripheral wall thereof. The reel body has a pawl mounted in a forward position thereof for engaging the teeth. The pawl is controllable by a cam rotatable through a wire spring interlocked to a rotor drive shaft. The cam retracts the pawl from the teeth when the drive shaft rotates in a line winding direction, and allows the pawl under a spring load to engage one of the teeth when the drive shaft rotates in a line unwinding direction.

18 Claims, 18 Drawing Sheets

5,318,243

SPINNING REEL HAVING A DEVICE FOR PREVENTING BACKWARD ROTATION OF A ROTOR

BACKGROUND OF THE INVENTION

1. Field of the Invention

This invention relates to spinning reels, and more particularly to a technique for preventing backward rotation of a rotor supporting a bail.

2. Description of the Related Art

A spinning reel having a device for stopping backward rotation of a rotor is disclosed in Japanese Utility Model Publication No. 1988-64, for example. This prior reel includes a ratchet wheel mounted on a drive shaft for taking up a fishing line, and a cam-like control element operable through a friction structure. When the drive shaft rotates in a direction to take up the fishing line, the drive shaft changes the position of the control element. As a result, pawls become disengaged from the ratchet wheel, thereby stopping sounds of contact therebetween.

This prior construction has the advantages of being quiet at a line winding time and reducing wear of the pawls and the like. However, since the ratchet wheel is mounted on the drive shaft interlocked to a line winding handle, the ratchet wheel must have a limited number of teeth. When the angler swings a fishing rod in an attempt to land a fish, for example, the rotor often rotates backward due to a distance between adjacent teeth of the ratchet wheel.

This allows the fishing line to be unwound at least by an amount corresponding to an amount of backward rotation of the rotor, which results in a delay in the timing of fish landing action, and produces a shock. Thus, there is room for improvement.

SUMMARY OF THE INVENTION

The object of the present invention is to provide an improved spinning reel which is convenient to use and capable of quickly stopping backward rotation of the rotor while retaining the advantage of quietness noted above.

The above object is fulfilled, according to the present invention, by a spinning reel comprising a rotor supporting a bail and defining a plurality of teeth on an inner peripheral wall thereof, a pawl supported in a forward position of a reel body for engaging the teeth, and a position switching mechanism operable in response to drive in a line winding direction of a drive system for retracting the pawl from the teeth, and in response to drive in a line unwinding direction of the drive system for allowing the pawl to engage one of the teeth.

This construction has the following functions and effects:

Where the above features are arranged as shown in FIGS. 1 and 2, for example, a rotor 5 defines teeth 8 on an inner peripheral wall thereof as distinct from the prior art having a ratchet wheel mounted on a drive shaft 6. The inner peripheral wall of the rotor allows formation of an increased number of teeth 8 at reduced intervals. When a fishing rod is swung to land a fish, the rotor 5 rotates a lesser amount backward than in the prior art before a pawl 9 engages one of the teeth 8. Moreover, according to the present invention, a position switching mechanism A moves the pawl 9 out of contact with the teeth 8 when the drive system rotates in the line winding direction.

That is, the present invention suppresses such inconveniences as noise and wear due to the contact between the pawl 9 and teeth 8 when the fishing line is wound, and reduces an amount of line unwinding when the fishing rod is swung to land a fish. In addition, the fishing rod may have a reduced operating stroke required until completion of adjustment to the fish.

Thus, the present invention provides an improved spinning reel capable of quickly stopping backward rotation of the rotor while retaining the advantage of quietness.

In another aspect of the invention, a spinning reel comprises a one-way clutch mounted in a transmission line from a handle to a rotor, the clutch including a plurality of teeth formed on an inner peripheral wall of the rotor, and a pawl for engaging the teeth to stop rotation of the rotor, the number of teeth being in a range of 18 to 28.

This construction has the following functions and effects:

Where the above features are arranged as shown in FIGS. 6 and 7, for example, a pawl 9 engages one of teeth 8 of a one-way clutch C during a fish landing operation. The number of teeth 8 is at least twice the number of teeth in a conventional one-way clutch, thereby greatly reducing play in the line unwinding direction of the rotor 5. Since these teeth 8 are formed on the inner peripheral wall of the rotor 5, the contact positions between the teeth 8 and pawl 9 need not be reduced in dimension despite the increase in the number of teeth 8.

The range of values 18 to 28 is determined with reference to the diameter of the rotor in conventional spinning reels (which is 50 to 70 millimeters). It has been confirmed by experiment that this range effectively reduces the play without reducing strength.

According to the present invention, the teeth 8 are formed on the inner peripheral wall of the rotor 5 instead of employing a ratchet wheel. This realizes a reduction in the amount of play of the rotor 5 without impairing strength of the teeth 8. The number of components is reduced by dispensing with the ratchet wheel as used in the prior art. The one-way clutch C receives tension of the fishing line only through the rotor 5, which effectively reduces chattering compared with the prior art in which a transmission shaft or the like is interposed between the clutch and rotor.

Thus, the present invention provides an improved spinning reel which allows a quick fish landing operation without involving a reduction in strength, and which is free from chattering over a long period of use.

In a further aspect of the present invention, the reel body includes a lid removably mounted laterally thereof, and an oscillating mechanism for axially reciprocating a spool through a predetermined range of strokes with rotation of the rotor. The oscillating mechanism includes a spool driving screw shaft mounted in the reel body and extending in a fore and aft direction of the reel body. The pawl is supported on a front wall of the reel body through a support axis extending in the fore and aft direction of the reel body.

The screw shaft may be disposed in a position corresponding to one of an upper half and a lower half of the front wall of the reel body, and the support axis of the pawl may be disposed in a position on the front wall opposite from the lid and in one of the upper half and lower half of the front wall remote from the screw shaft.

The above construction advantageously has the following functions and effects:

The front wall is continuous with the opposite side wall having no lid, and is therefore stronger than the side wall to which the lid is attached. The support axis is disposed in a position on the front wall remote from the side wall to which the lid is attached. Compared with case of the support axis being disposed adjacent the side wall having the lid attached thereto, the front wall may have a reduced thickness and may require less reinforcing ribs or the like.

Further, since the support axis is disposed in the position vertically spaced and in substance diagonally opposite from the screw shaft, an opening may be formed in the front wall of the reel body for supporting the support axis in a position remote from an opening formed in the front wall for receiving the screw shaft for assembly. This reduces a load to which the front wall is subjected, and allows the front wall to have a reduced thickness and require less ribs or the like.

Thus, by arranging the various components in a rational way, the front wall of the reel body may be formed thin with little reinforcement. This feature contributes toward a lightweight reel and compactness of the reel with the components arranged in a well distributed way.

In a still further aspect of the invention, a spinning reel comprises a spring for biasing the pawl toward the teeth, a cam switchable between a rotation allowing position for contacting the pawl to disengage the pawl from the teeth, and a rotation stopping position for allowing the pawl to engage one of the teeth, and a frictional control device disposed between the cam and the drive system for switching the cam to the rotation allowing position when the rotor rotates in the line winding direction, and to the rotation stopping position when the rotor rotates in the line unwinding direction. The spring has a biasing force weaker than an operating force of the frictional control device occurring when the rotor rotates in the line winding direction, and stronger than a position retaining force of the frictional control device occurring when the rotor stops rotating in the line winding direction.

The above construction advantageously has the following functions and effects:

The above features may be arranged as shown in FIGS. 17 and 18, for example. When a handle is turned to rotate a rotor 5 in a line winding direction, a frictional control device E sets a cam 11 to a rotation allowing position F. Consequently, a fishing line is wound with a pawl 9 placed out of contact with teeth 8. When the handle operation is stopped, a spring 13 of the pawl 9 switches the cam 11 to a rotation stopping position S against the frictional force of the frictional control device E, and moves the pawl 9 into engagement with one of the teeth 8.

Thus, according to the present invention, when winding the fishing line, the contact between the pawl 9 and teeth 8 is prevented only by turning the handle as in the prior art, thereby eliminating the contact sounds and wear. The pawl 9 engages one of the teeth 8 when the handle operation for winding the fishing line is stopped. Consequently, the rotor 5 does not rotate a large amount backward despite a tension acting on the fishing line immediately after the handle 1 is stopped.

Thus, by selecting a relative strength between the spring and frictional control device, an improved spinning reel is realized, which requires no special operation to check excessive unwinding of the fishing line and a shock occurring when a tension is applied to the fishing line. This is achieved without impairing the advantage of eliminating the unpleasant sounds produced during a line winding operation and avoiding wear of the pawl and teeth.

In yet another aspect of the present invention, a spinning reel comprises a rotor including a pair of arms, one of which supports an arm cam, and the other supports a support arm, the arm cam and support arm supporting a bail to be switchable between a release position and a winding position. The arm supporting the arm cam includes a controller for switching the bail to the release position. A one-way clutch is provided for stopping rotation in the line unwinding direction of the rotor, the rotor being stopped by the one-way clutch within a 30 degrees rotation.

The above construction advantageously has the following functions and effects:

The above features may be arranged as shown in FIGS. 20 through 23, for example. For switching the bail 4 to the release position, the angler sets a one-way clutch to an operative position, turns a handle 1 to bring an arm cam 37 upward, and extends a finger of his or her hand holding a fishing rod R to operate the controller 40. When a torque is applied by contact with the finger to rotate a rotor 5 in a line unwinding direction, the one-way clutch limits the rotation within 30 degrees.

According to the present invention, as in the prior art, the angler operates the controller to switch the bail to the release position while holding the fishing line at the same time. However, since the one-way clutch allows the rotor 5 to rotate only a small amount, the controller 40 is operable smoothly and quickly without a special structure for restricting position of the controller 40.

Thus, the present invention provides an improved spinning reel which facilitates the bail switching operation without impairing the advantage of the prior art that the bail is switched to the release position by a one-touch operation of a single controller while holding the fishing line at the same time.

Other features and advantages of the invention will be apparent from the following description.

DETAILED DESCRIPTION OF THE PREFERRED EMBODIMENTS

Embodiments of the present invention will be described in detail with reference to the drawings.

Figure 1:
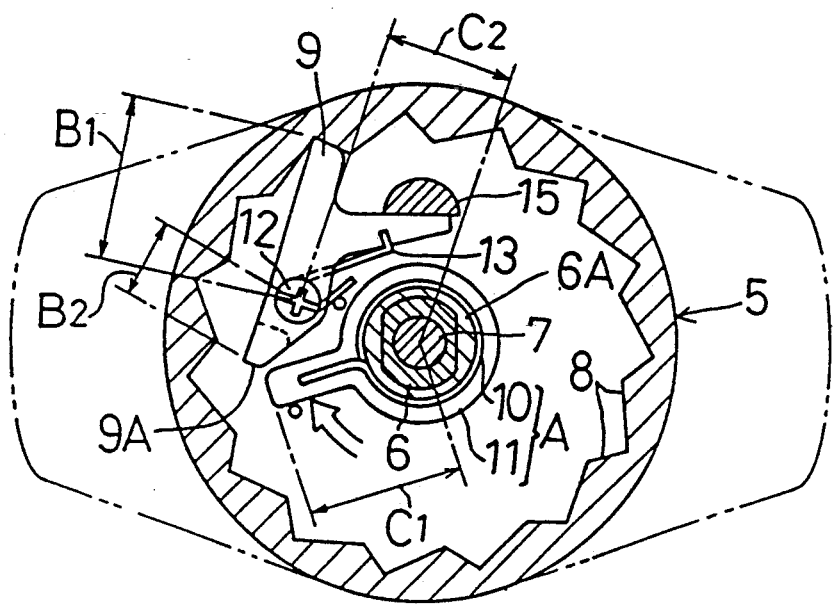
FIG. 1 is a sectional view of a rotor interior of a spinning reel according to the present invention, in a state of preventing backward rotation of a rotor.
Figure 2:
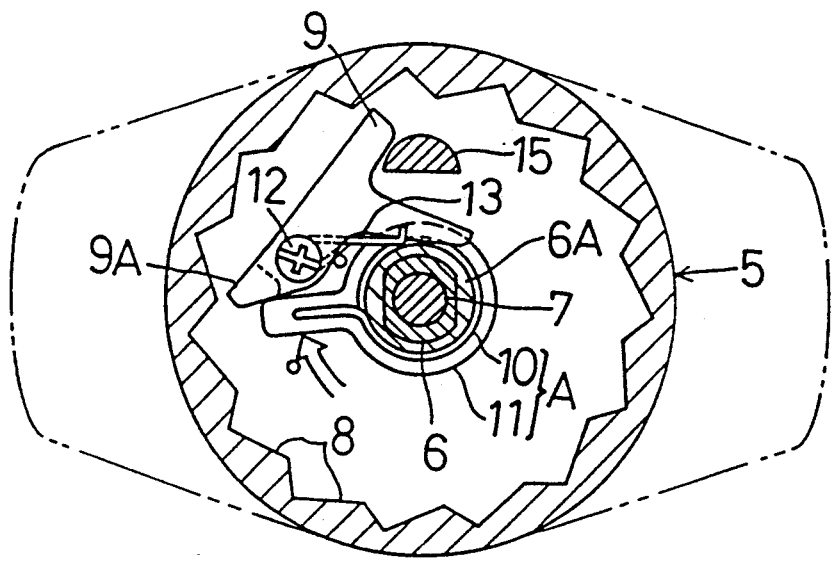
FIG. 2 is a sectional view of the rotor interior during a line winding operation.
Figure 3:
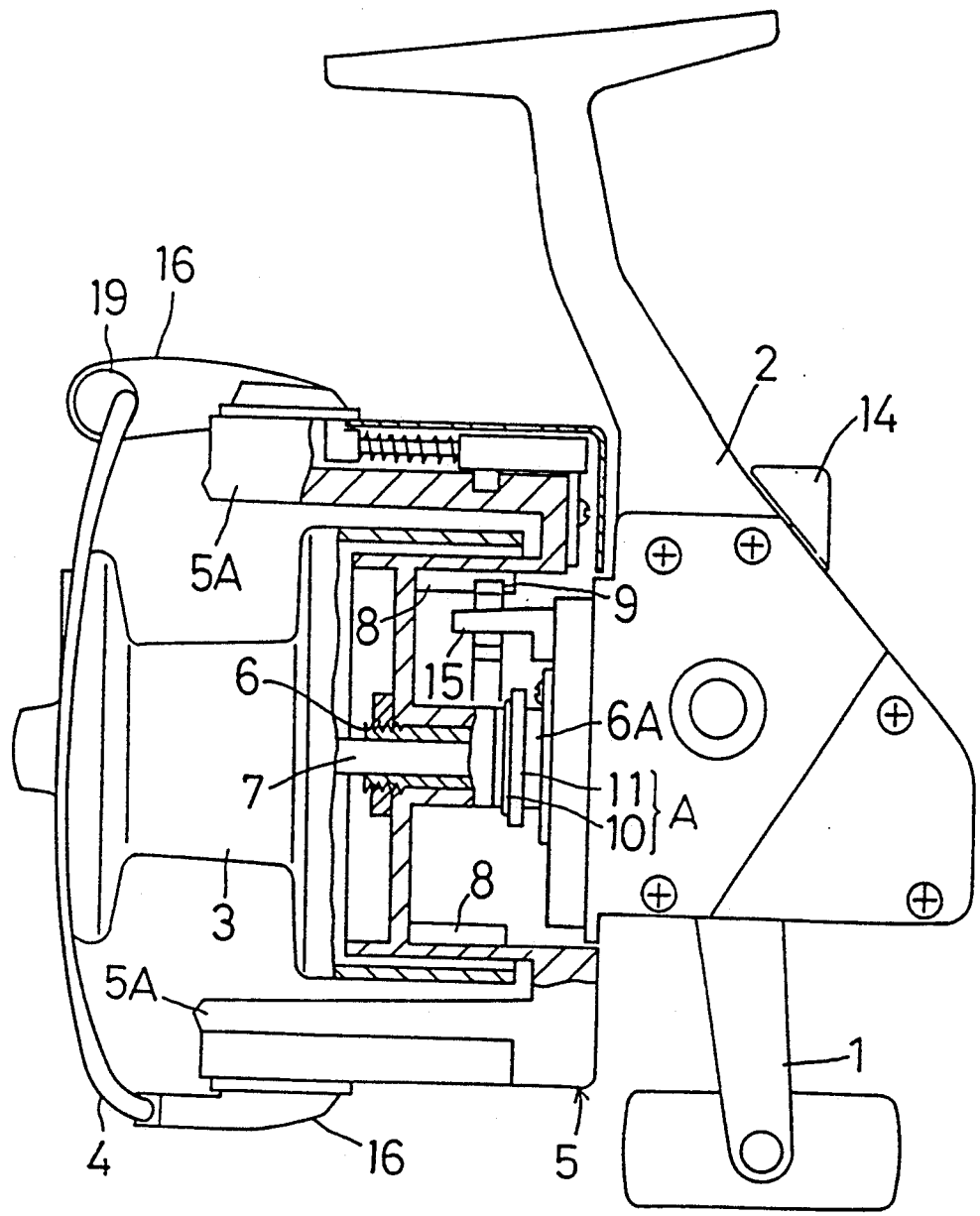
FIG. 3 is a side view, partly in section, of the spinning reel.

As shown in FIGS. 1 through 3, a spinning reel includes a handle 1 attached to a reel body 2, a spool 3 connected to a forward portion of the reel body 2 for winding a fishing line (not shown), and a rotor 5 carrying a bail arm 4 and mounted on the forward portion of the reel body 2.

Drive is transmitted from the handle 1 to the rotor 5 through a tubular drive shaft 6. The drive shaft 6 surrounds a spool shaft 7 supporting the spool 3 on a forward end thereof.

A one-way clutch is provided between the forward portion of the reel body 2 and the rotor 5 for stopping rotation in a line unwinding direction of the rotor 5. The clutch includes a plurality of teeth 8 formed on an inner peripheral wall of the rotor 5, a pivotable pawl 9 for engaging the teeth 8, and a position switching mechanism A for controlling the pawl 9. The position switching mechanism A includes a cam 11 rotatable through a wire spring 10 fitted on an outer surface of an element 6A mounted on the drive shaft 6 to be rotatable therewith. The cam 11 acts on the pawl 9 to retract the pawl 9 from the teeth 8 when the drive shaft 6 rotates in a line winding direction, and to cause the pawl 9 to engage one of the teeth 8 when the drive shaft 6 rotates in a line unwinding direction.

The pawl 9 is pivotable about a support axis 12 and biased by a spring 13 toward the teeth 8. The pawl 9 has a tooth-engaging end having a distance B1 to the support axis 12, which distance B1 is greater than a distance B2 between the support axis 12 and an opposite, non-engaging end 9A of the pawl 9. The cam 11 has a free end projecting a relatively long distance C1 from an axis of the drive shaft 6. This construction causes the pawl 9 to respond quickly to rotation of the drive shaft 6.

It will be seen that the distance C1 from the axis of the drive shaft 6 to the free end of the cam 11 is greater than a distance C2 from the axis of the drive shaft 6 to the support axis 12 of the pawl 9.

This reel further includes a switch lever 14 attached to the reel body 2 as shown in FIG. 3, and a stopper 15 controllable by the lever 14 for allowing the pawl 9 to engage one of the teeth 8 as shown in FIG. 1. When a reversing force is applied to the rotor 5 with the stopper 15 placed in this state, the drive shaft 6 interlocked to the rotor 5 rotates backward whereby the cam 11 moves away from the pawl 9. As a result, the pawl 9 under the biasing force of the spring 13 moves into engagement with one of the teeth 8 to stop backward rotation of the rotor 5. When the handle 1 is turned in the line winding direction, the resulting rotation of the drive shaft 6 causes the cam 11 to press on the pawl 9. As a result, the pawl 9 is retracted from the teeth 8 to allow a smooth line winding operation.

Figure 4:
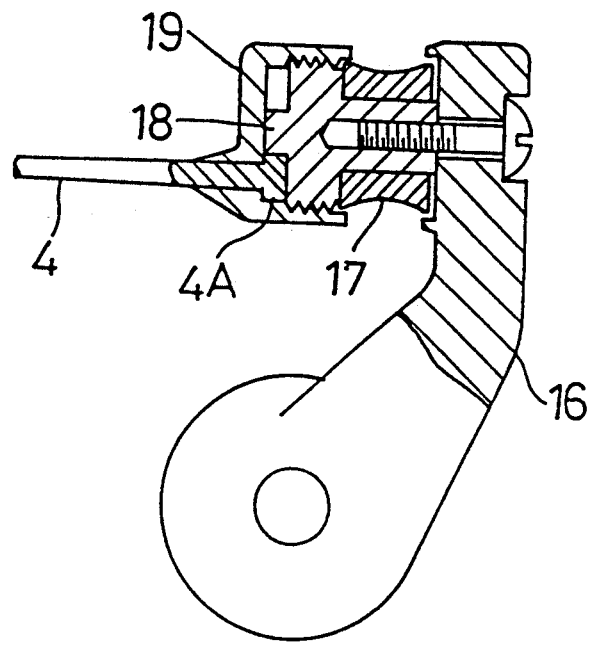
FIG. 4 is a sectional view of a bail support structure.

The bail 4 is oscillatably supported by the rotor 5 through oscillatable arms 16 connected to a pair of arms 5A of the rotor 5, respectively. The bail 4 is thicker at opposite ends than at an intermediate portion thereof to offset a weight imbalance of a rotating system. As shown in FIG. 4, one end of the bail 4 defines a retainer 4A supported in a cover 19 screwed to a bearing member 18 supporting a line roller 17.

Figure 5:
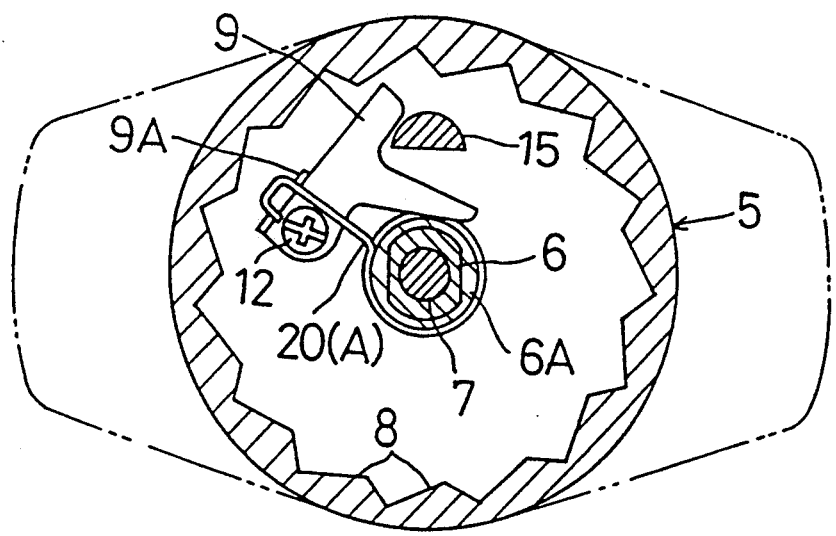
FIG. 5 is a sectional view of a modified rotor interior.

FIG. 5 shows a modified anti-reversing construction. In this construction, the position switching mechanism A includes a spring 20 fitted on the element 6A mounted on the drive shaft 6 to be rotatable therewith. The spring 20 is connected to a non-engaging end 9A of the pawl 9 opposed to the drive shaft 6 across the support axis 12. This construction allows the spring 20 to have an extended arm length to realize a quick control of the pawl 9.

According to the present invention, the position switching mechanism A may be adapted operable by a torque of the rotor. A plurality of pawls may be provided instead of one.

Another embodiment will be described next.

Figure 8:
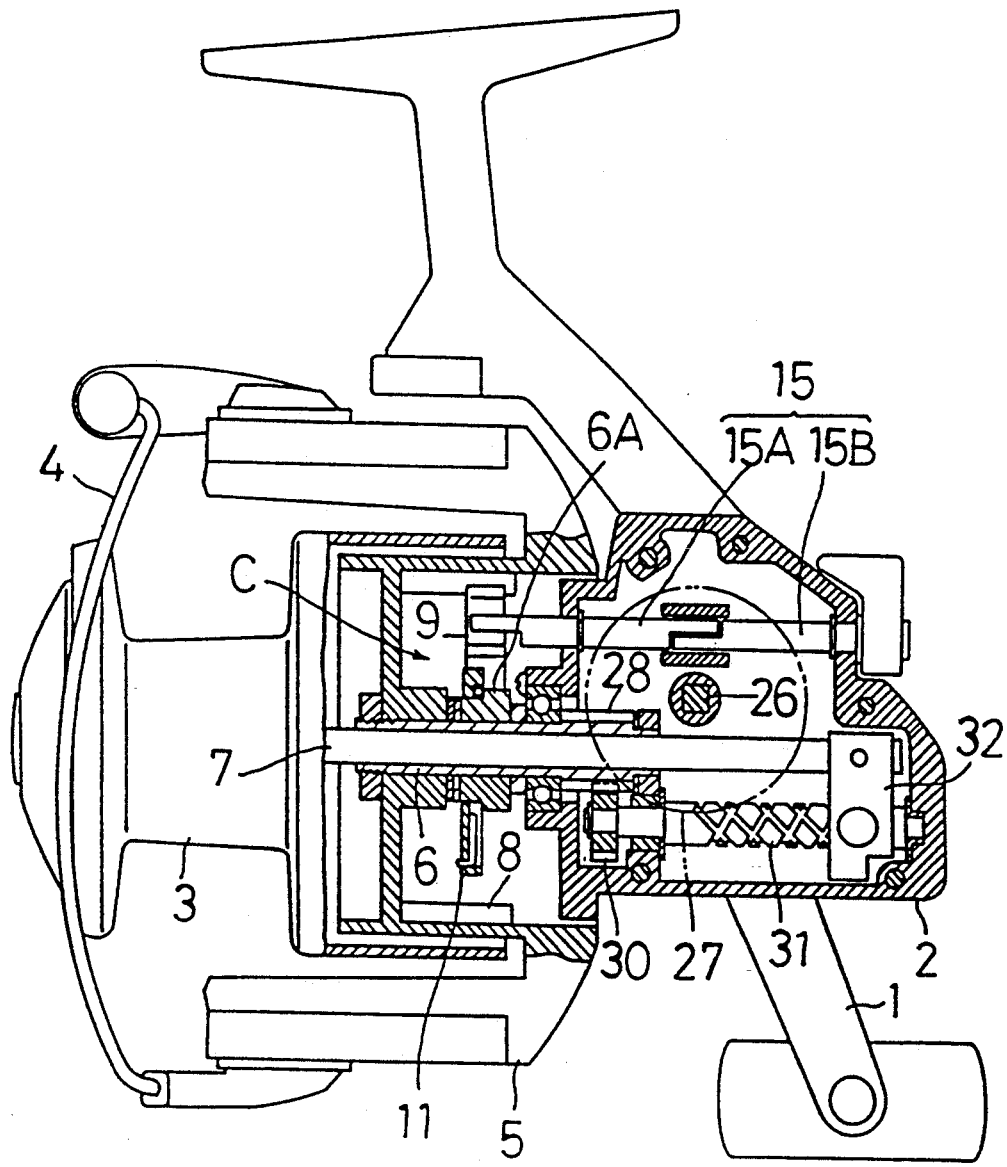
FIG. 8 is a side view, partly in section, of a spinning reel having the one-way clutch shown in FIG. 6.

As shown in FIG. 8, a spinning reel includes a handle 1 attached to a reel body 2, and a spool 3 and a rotor 5 arranged forwardly of the reel body 2, the rotor 5 carrying a bail arm 4. The spinning reel further includes a drive system for transmitting drive from a drive gear 27 rotatable by a handle shaft 26 to the rotor 5 through a pinion gear 28 and a drive shaft 6, and an oscillating mechanism converting drive from the pinion gear 28 into a reciprocal motion back and forth for transmission to a spool shaft 7. The oscillating mechanism includes an input gear 30, a screw shaft 31, and a slider 32.

Figure 6:
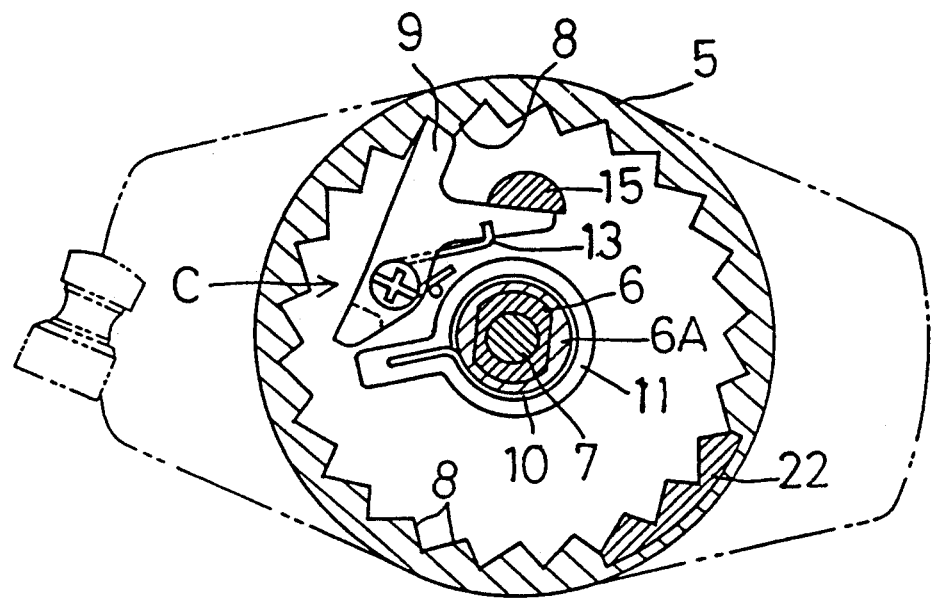
FIG. 6 is a sectional view of a one-way clutch in another embodiment of the invention with a pawl placed in an engaged position.
Figure 7:
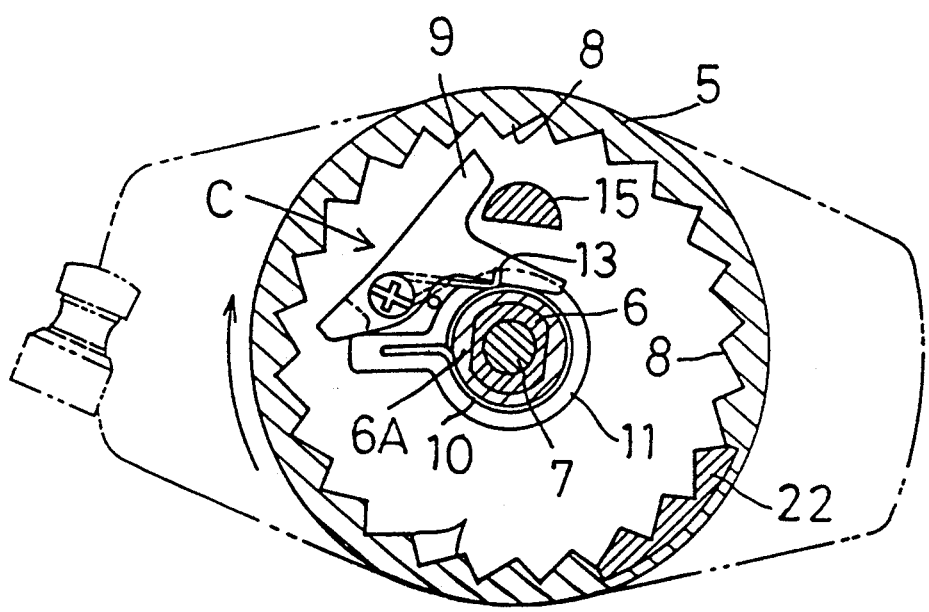
FIG. 7 is a sectional view of the one-way clutch shown in FIG. 6, with the pawl placed in a retracted position.

As shown in FIGS. 6 and 7, the rotor 5 has a one-way clutch C mounted therein for preventing the rotor 5 from rotating in a line unwinding direction.

The one-way clutch C includes a plurality of teeth 8 formed on an inner peripheral wall of the rotor 5, a pivotable pawl 9 for engaging the teeth 8 to stop rotation of the rotor 5, and a control device for retracting the pawl 9 from the teeth 8 when the rotor 5 rotates in a line winding direction, and allowing the pawl 9 to engage one of the teeth 8 when the rotor 5 rotates in the line unwinding direction. The number of teeth 8 is 24 (preferably 18 to 28) which secures a sufficient strength and yet allows quick fish landing action.

The control device includes a cam 11 rotatable relative to an element 6A mounted on the drive shaft 6 to be rotatable therewith, a spring 10 acting as a friction element fitted on the element 6A with a suitable frictional force, and a spring 13 for biasing the pawl 9 toward the teeth 8. When the rotor 5 rotates in the line unwinding direction, the cam 11 under the force of the friction element 10 moves away from the pawl 9 with rotation of the element 6A as shown in FIG. 6. As a result, the pawl 9 under the biasing force of the spring 13 moves into engagement with one of the teeth 8. When the rotor 5 rotates in the opposite direction, the cam 11 contacts the pawl 9 and retracts the pawl 9 from the teeth 8 as shown in FIG. 7, thereby to eliminate contact sounds during a line winding operation.

The control device includes a stopper 15 for contacting the pawl 9 to hold the pawl 9 out of engagement with the teeth 8, thereby allowing free rotation in the line unwinding direction of the rotor 5. As shown in FIG. 8, the stopper 15 includes a forward portion 15A for contacting the pawl 9, and a rearward portion 15B having a switch lever 19. The stopper 15 has an intermediate coupling portion so that the forward portion 15A and rearward portion 15B may be inserted into the reel body 2 rearwardly and forwardly for assembly.

Figure 9:
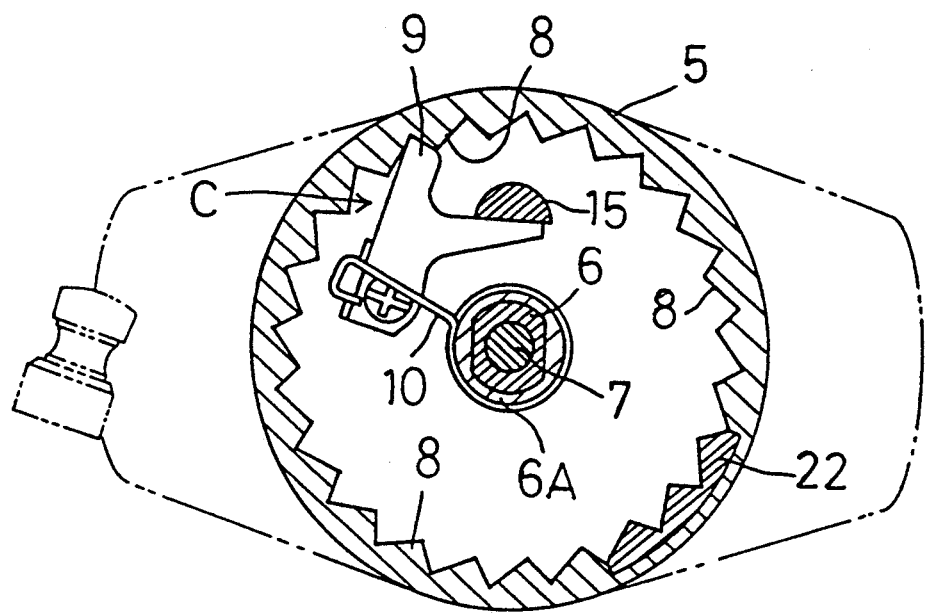
FIG. 9 is a sectional view of a one-way clutch in a further embodiment of the invention.

The rotor 5 is formed of a plastic, which may include a metal 22 forming part of the teeth 8 for balance of rotation as shown in FIG. 9.

The one-way clutch C may include a control device having a spring 10 fitted on the element 6A for directly controlling position of the pawl 9 as shown in FIG. 9. The spring 13 for biasing the pawl 9 may be omitted.

A further embodiment will be described next.

Figure 13:
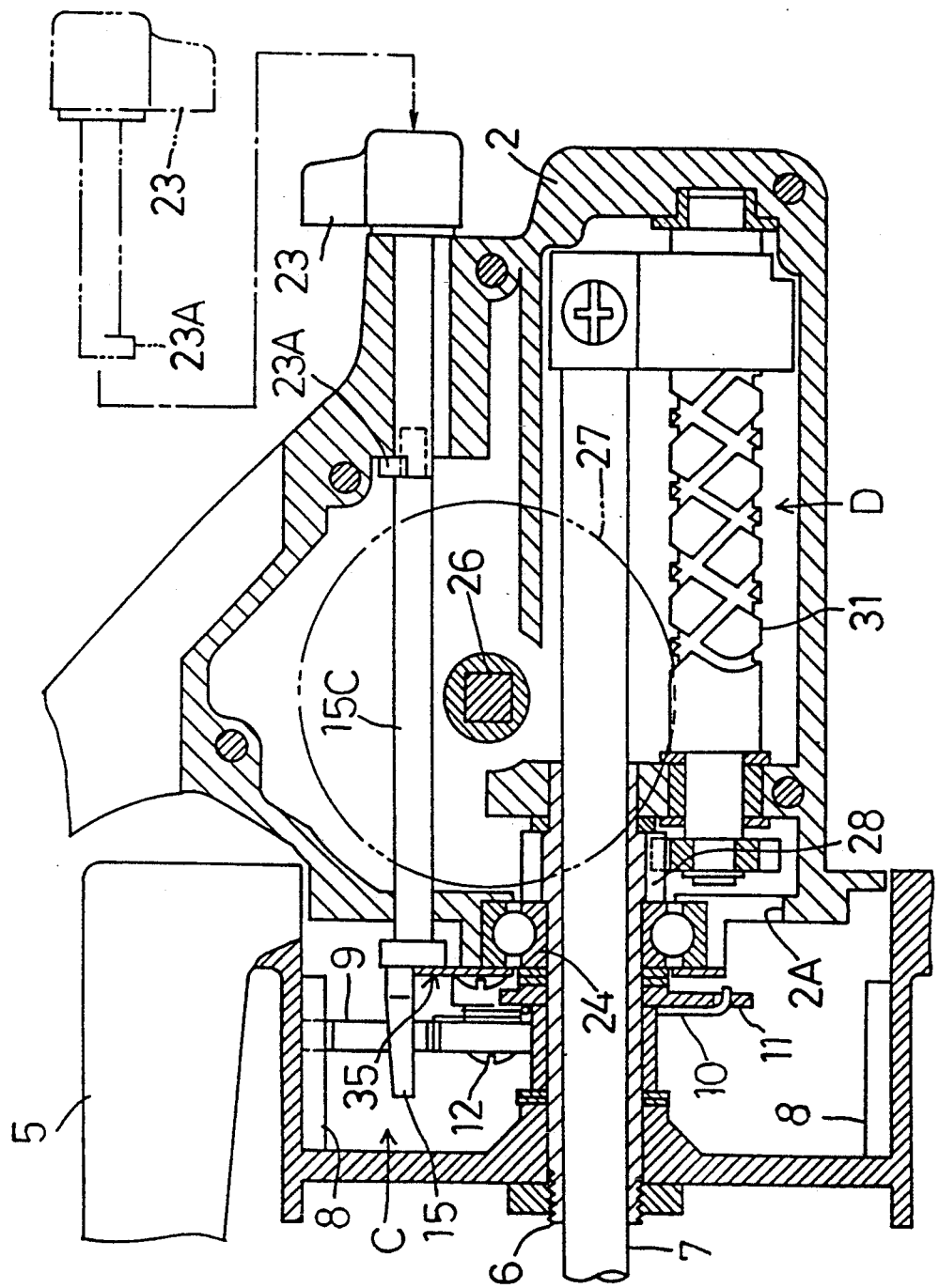
FIG. 13 is a side view in vertical section of the reel body in the embodiment shown in FIG. 10.
Figure 16:
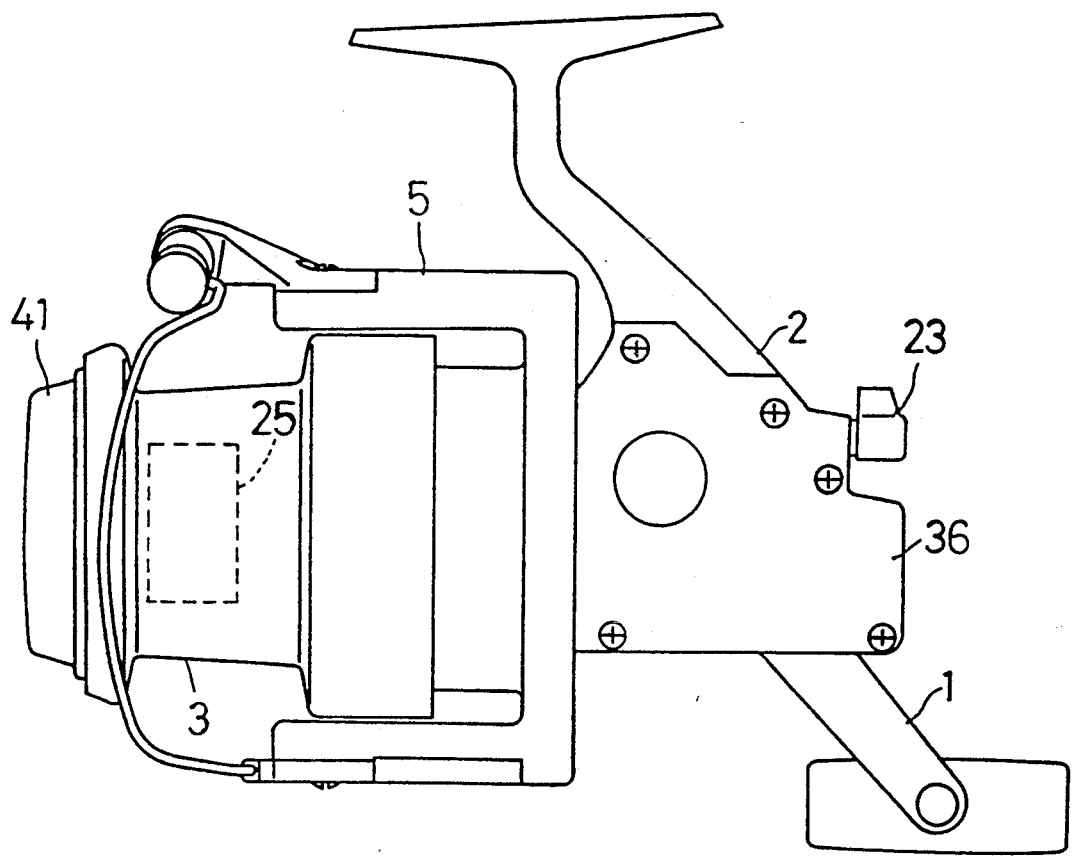
FIG. 16 is a side view of a spinning reel in the embodiment shown in FIG. 10.

As shown in FIGS. 13 and 16, a spinning reel includes a handle 1 attached to a reel body 2, and a spool shaft 7 extending from the reel body 2. The spool shaft 7 carries a spool 3, with a drag device 25 disposed between the spool shaft 7 and spool 3. The spool 3 is rigidly connected to the spool shaft 7. A drive shaft 6 is relatively rotatably mounted on a proximal portion of the spool shaft 7, and a rotor 5 is mounted for unitary rotation on the drive shaft 6. A pinion gear 28 is formed on a portion of the drive shaft 6 disposed in the reel body 2. The pinion gear 28 is meshed with a drive gear 27 mounted on a handle shaft 26, whereby the rotor 5 is operable by turning of the handle 1 to wind a fishing line. An oscillating mechanism D is reciprocable through a predetermined range of strokes with rotation of the rotor 5.

Figure 15:
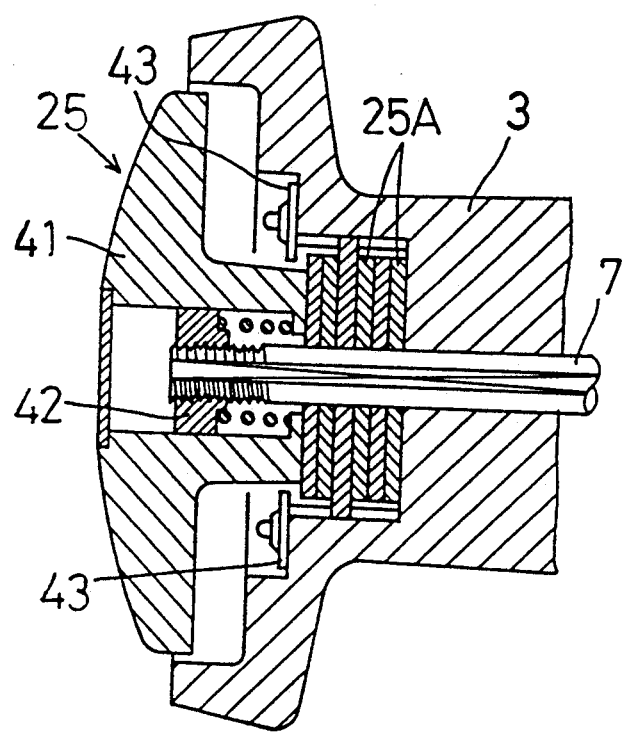
FIG. 15 is a side view in vertical section showing a drag structure in the embodiment shown in FIG. 10.

A mounting structure for the drag device 25 will be described. As shown in FIG. 15, the spool 3 defines an internal space opening forwardly. This internal space accommodates a plurality of friction plates 25A mounted on the spool shaft 7. A drag controller 41 is screwed to the spool shaft 7 by means of a nut 42, and a bush nut 43 is disposed in an outlet of the internal space for retaining the friction plates 25A in position. Bolts may be used instead of the bush nut 43 to retain the friction plate 25A in position by means of bolt heads.

Figure 10:
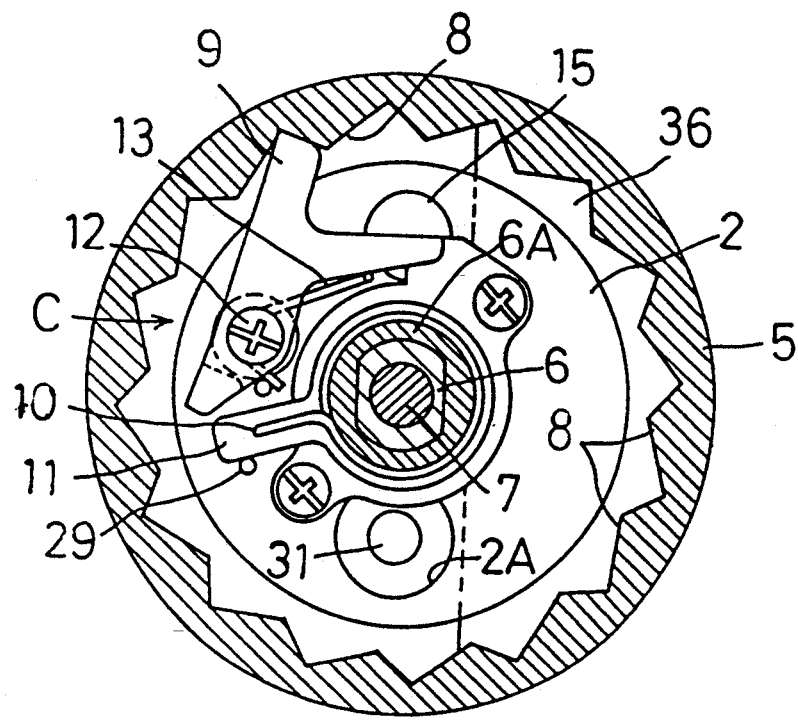
FIG. 10 is a front view in vertical section of a one-way clutch in a still further embodiment of the invention.

The rotor 5 has a one-way clutch C as shown in FIG. 10. The one-way clutch C includes a plurality of teeth 8 formed on an inner peripheral wall of the rotor 5, and a pawl 9 for engaging the teeth 8 to stop rotation of the rotor 5. The pawl 9 is attached to a support axis 12 extending parallel to the spool shaft 7 and disposed in an upper left position in front view of the reel body 2.

The drive shaft 6 carries, on a portion thereof extending into the internal space of the rotor 5, a cam 11 relatively rotatably mounted thereon and a spring 10 disposed adjacent to the cam 11. The spring 10 has a proximal end thereof loosely fitted on an element 6A fixed to the drive shaft 6. A free end of the spring 10 is engaged with the cam 11, so that the spring 10 and cam 11 are rotatable together. The proximal end of the spring 10 is wound around the element 6A in a single wind with a suitable pressing force to be rotatable therewith. A stopper pin 29 is provided to limit rotation of the cam 11 to a predetermined angle. When the cam 11 is stopped by the stopper pin 29, the spring 10 slips relative to the element 6A. The pawl 9 is biased toward the teeth 8 by a spring 13. The cam 11 has an end for contacting the pawl 9 to move the pawl 9 out of engagement with the teeth 8.

According to the above construction, when the rotor 5 rotates in a line winding direction, the cam 11 rotates through the predetermined angle and contacts the pawl 9 to move the pawl 9 out of engagement with the teeth 8. When the rotor 5 rotates in a line unwinding direction, the cam 11 rotates in the opposite direction through the predetermined angle away from the pawl 9, whereby the pawl 9 engages one of the teeth 8.

A control structure for switching the one-way clutch C between an operative position and an inoperative position will be described. As shown in FIG. 13, a stopper knob 23 projects rearwardly of the reel body 2, and a control shaft 15C interlocked to the stopper knob 23 extends in the fore and aft direction through the reel body 2. The control shaft 15C has a forward end extending through the front wall of the reel body 2 to a position adjacent the pawl 9 and defining a stopper 15. The stopper 15 contacts an end of the pawl 9 remote from the end thereof contactable with the cam 11, thereby switching the pawl 9 to a disengaged position.

Thus, when the stopper knob 23 is operated in one direction, the stopper 15 acts on the pawl 9 to switch the pawl 9 to the disengaged position. Consequently, the one-way clutch C is switched to the inoperative position to allow free rotation of the rotor 5 both in the line winding direction and line unwinding direction. When the stopper knob 23 is operated in the other direction, as shown in FIG. 10, the stopper 15 moves away from the pawl 9 to allow the pawl 9 to engage one of the teeth 8. In this state, the one-way clutch C is switched to the operative position to prevent the rotor 5 from rotating in the line unwinding direction and allow the rotor 5 to rotate in the line winding direction.

Figure 14:
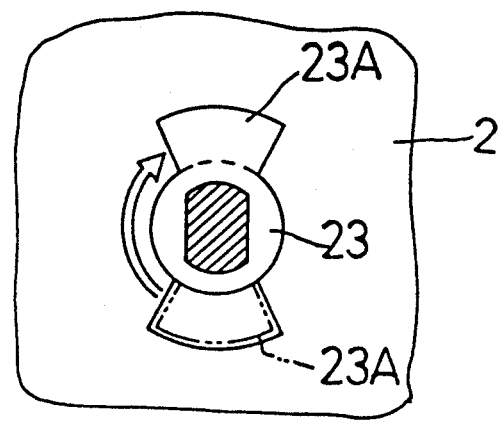
FIG. 14 is a rear view in vertical section showing a connection structure between the control shaft and a stopper knob in the embodiment shown in FIG. 10.

As shown in FIGS. 13 and 14, the control shaft 15C and stopper knob 23 are interconnected through opposed ends thereof having track-shaped sections to be rotatable together and detachable from each other. The end of the stopper knob 23 opposed to the control shaft 15C defines a projection 23A offset from the axis of the stopper knob 23. For assembling the stopper knob 23 to the reel body 2, the stopper knob 23 is inserted through a rear end wall of the reel body 2 with the projection 23A extending downwardly. Thereafter the stopper knob 23 is turned to bring the projection 23A upward, whereby the stopper knob 23 is retained in position with an inner wall surface of the reel body 2 contactable with the projection 23A.

Figure 11:
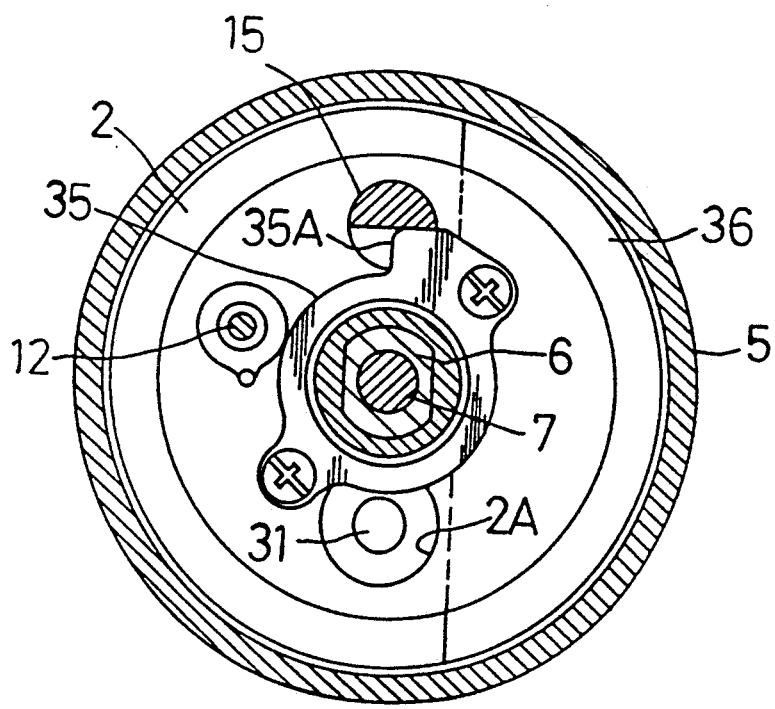
FIG. 11 is a front view in vertical section showing a stopper control shaft and a bearing retainer in the embodiment shown in FIG. 10.

The reel body 2 includes a bearing 24 mounted in a front end wall thereof for rotatably supporting the drive shaft 6. The bearing 24 is retained in position by a bearing retainer 35 screwed to the front end wall. As shown in FIG. 11, the bearing retainer 35 includes an upper projection 35A for contacting a bottom of a semicircular cam surface of the stopper 15 formed at the forward end of the control shaft 15C. The projection 35A provides a stopper surface for limiting rotation of the control shaft 15C for switching the pawl 9 between the engaged position and disengaged position.

Figure 12:
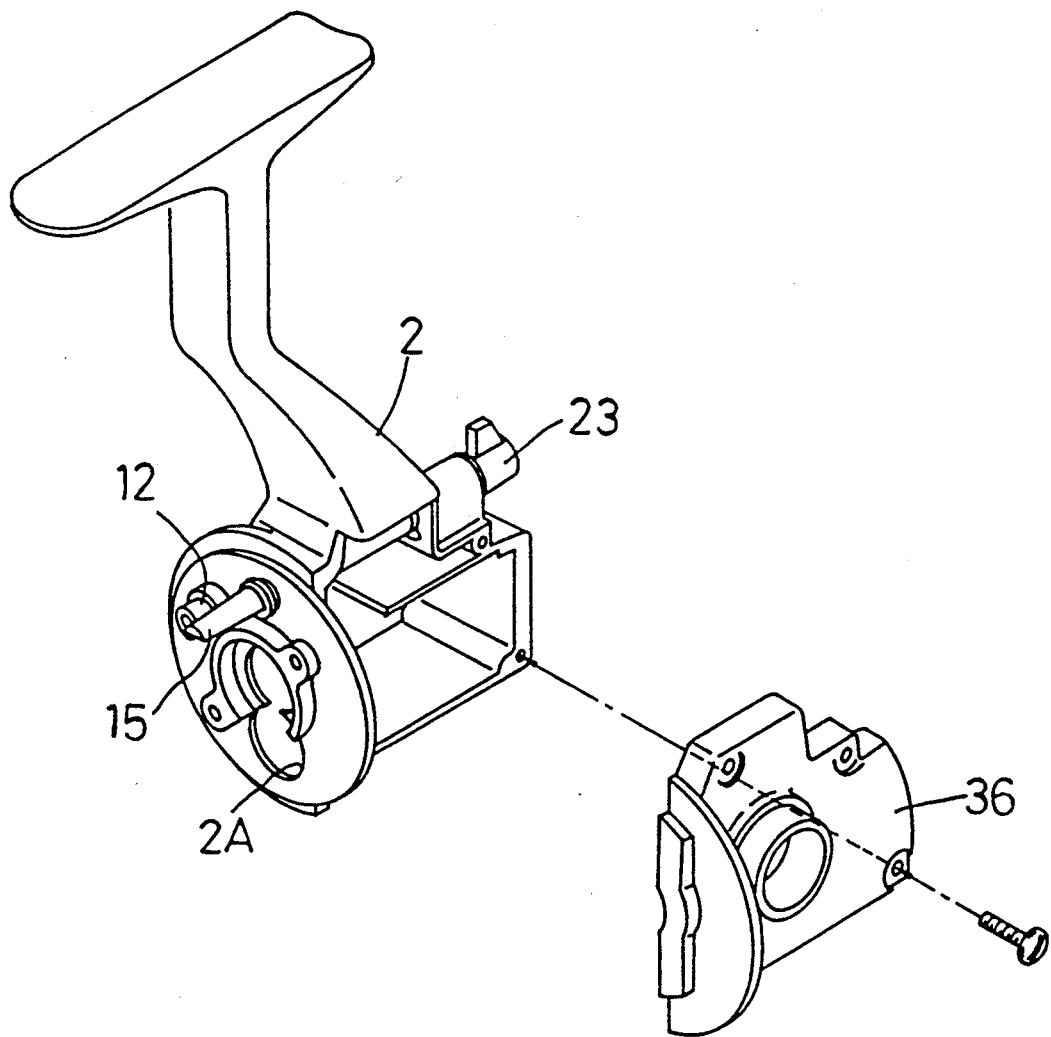
FIG. 12 is an exploded perspective view of a reel body in the embodiment shown in FIG. 10.

As shown in FIG. 12, a lid 36 is attached to a left side of the reel body 2, which lid is removable for exposing an interior space of the reel body 2. The support axis 12 of the pawl 9 is disposed on the right side of the reel body 2 opposite from where the lid 36 is attached. The reel body 2 has a perforation 2A defined in a lower front wall thereof for receiving a spool driving screw shaft 31 forming part of the oscillating mechanism D. The support shaft 12 and screw shaft 31 are arranged in a vertically opposed relationship. Thus, the support shaft 12 which is subjected to a strong reaction when the rotor 5 is stopped is disposed in the region remote from the lid 36 and from the screw shaft 31.

The support shaft 12 may be disposed in an upper, lower, rightward or leftward position as long as the support shaft 12 is remote from the lid 36 and screw shaft 31.

A further embodiment will be described next.

Figure 17:
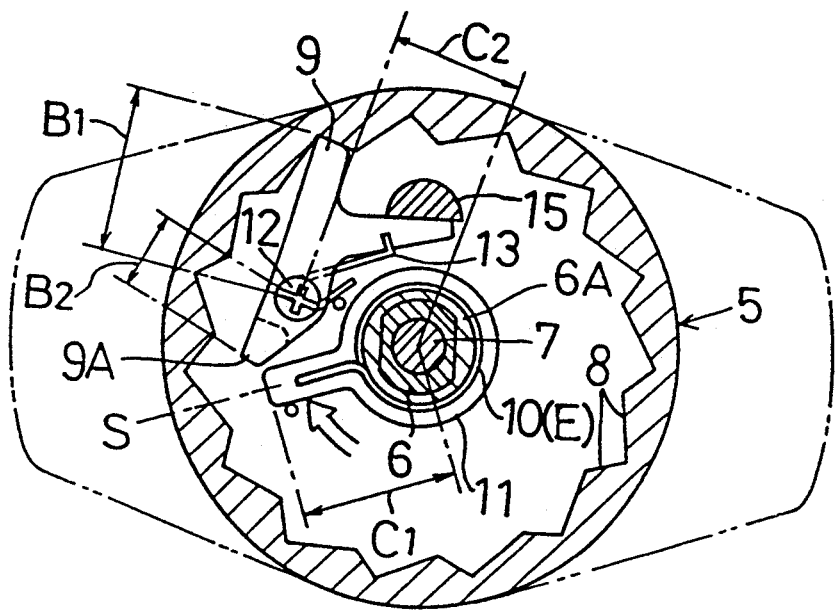
FIG. 17 is a front view of a cam and adjacent components in a position to stop backward rotation of a rotor in a further embodiment.
Figure 18:
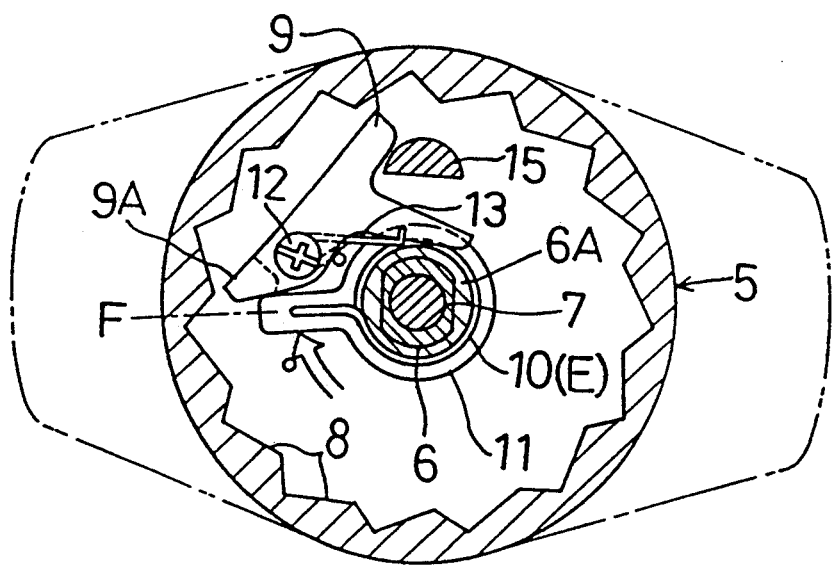
FIG. 18 is a front view of the cam and adjacent components in a position to allow rotation in a line winding direction of a rotor in the embodiment shown in FIG. 17.
Figure 19:
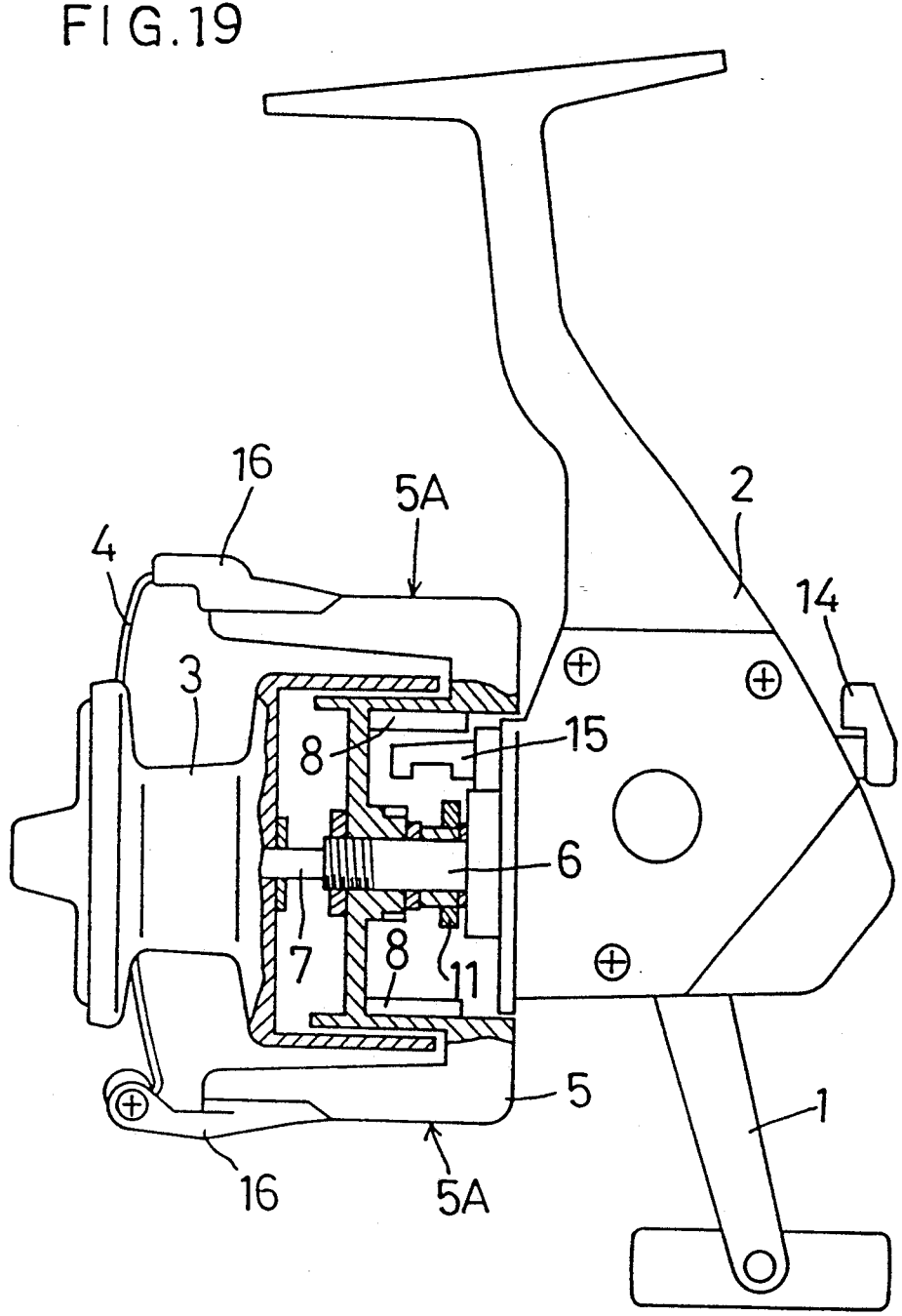
FIG. 19 is a side view, partly in section, of a spinning reel in the embodiment shown in FIG. 17.

As shown in FIGS. 17 through 19, a spinning reel includes a handle 1 attached to a reel body 2, a spool 3 connected to a forward portion of the reel body 2 for winding a fishing line not shown, and a rotor 5 carrying a bail arm 4 and mounted on the forward portion of the reel body 2.

Drive is transmitted from the handle 1 to the rotor 5 through a tubular drive shaft 6. The drive shaft 6 surrounds a spool shaft 7 supporting the spool 3 on a forward region thereof.

A one-way clutch is provided between the forward portion of the reel body 2 and the rotor 5 for stopping rotation in a line unwinding direction of the rotor 5. The clutch includes a plurality of teeth 8 formed on an inner peripheral wall of the rotor 5, a pivotable pawl 9 for engaging the teeth 8, a cam 11 for controlling the pawl 9, and a frictional control device E for determining position of the cam 11. With rotation in a line winding direction of the drive shaft 6, the frictional control device E sets the cam 11 to a rotation allowing position F as shown in FIG. 18. A wire spring 10 has one end thereof fitted on an outer surface of an element 6A rotatable with the drive shaft, and the other end connected to the cam 11. With rotation in a line unwinding direction of the drive shaft 6, the spring 10 sets the cam 11 to a rotation stopping position S as shown in FIG. 17.

The pawl 9 is pivotable about a support axis 12 and biased by a spring 13 toward the teeth 8. The pawl 9 has a tooth-engaging end having a distance B1 to the support axis 12, which distance B1 is greater than a distance B2 between the support axis 12 and an opposite, nonengaging end 9A of the pawl 9. The cam 11 includes a free end projecting a relatively long distance C1 from an axis of the drive shaft 6. This construction causes the pawl 9 to respond quickly to rotation of the drive shaft 6.

It will be seen that the distance C1 from the axis of the drive shaft 6 to the free end of the cam 11 is greater than a distance C2 from the axis of the drive shaft 6 to the support axis 12 of the pawl 9.

In this pawl control system, the spring 13 has a biasing force weaker than an operating force of the frictional control device E occurring when the rotor 5 rotates in the line winding direction. Further, the biasing force of the spring 13 is stronger than a position retaining force of the frictional control device E occurring when the rotor 5 stops rotating in the line winding direction. Consequently, when the handle 1 is turned in the line winding direction, the frictional control device E sets the cam 11 to the rotation allowing position F to allow the fishing line to be wound with the pawl 9 disengaged from the teeth 8 as shown in FIG. 18. When a winding operation of the handle 1 is stopped, the spring 13 of the pawl 9 switches the cam 11 to the rotation stopping position S against the frictional force of the frictional control device E, and moves the pawl 9 into engagement with one of the teeth 8 as shown in FIG. 17.

This reel further includes a stopper 15 rotatable through 90 degrees by operating a switch lever 14 attached to the reel body 2. The rotor 5 may be prevented from rotating backward when the stopper 15 is set to the position shown in FIGS. 17 and 18. The rotor 5 may be allowed to rotate backward when the stopper 15 is rotated through 90 degrees from this position.

The bail 4 is supported by the rotor 5 through oscillatable arms 16 connected to a pair of arms 5A of the rotor 5, to be oscillatable between a winding position and a release position.

This embodiment may be modified such that the one-way clutch comprises a combination of a pawl and a wheel defining outer gears. The frictional control device may comprise a flexible plastic element contacting a rotating system.

A further embodiment will be described next.

Figure 23:
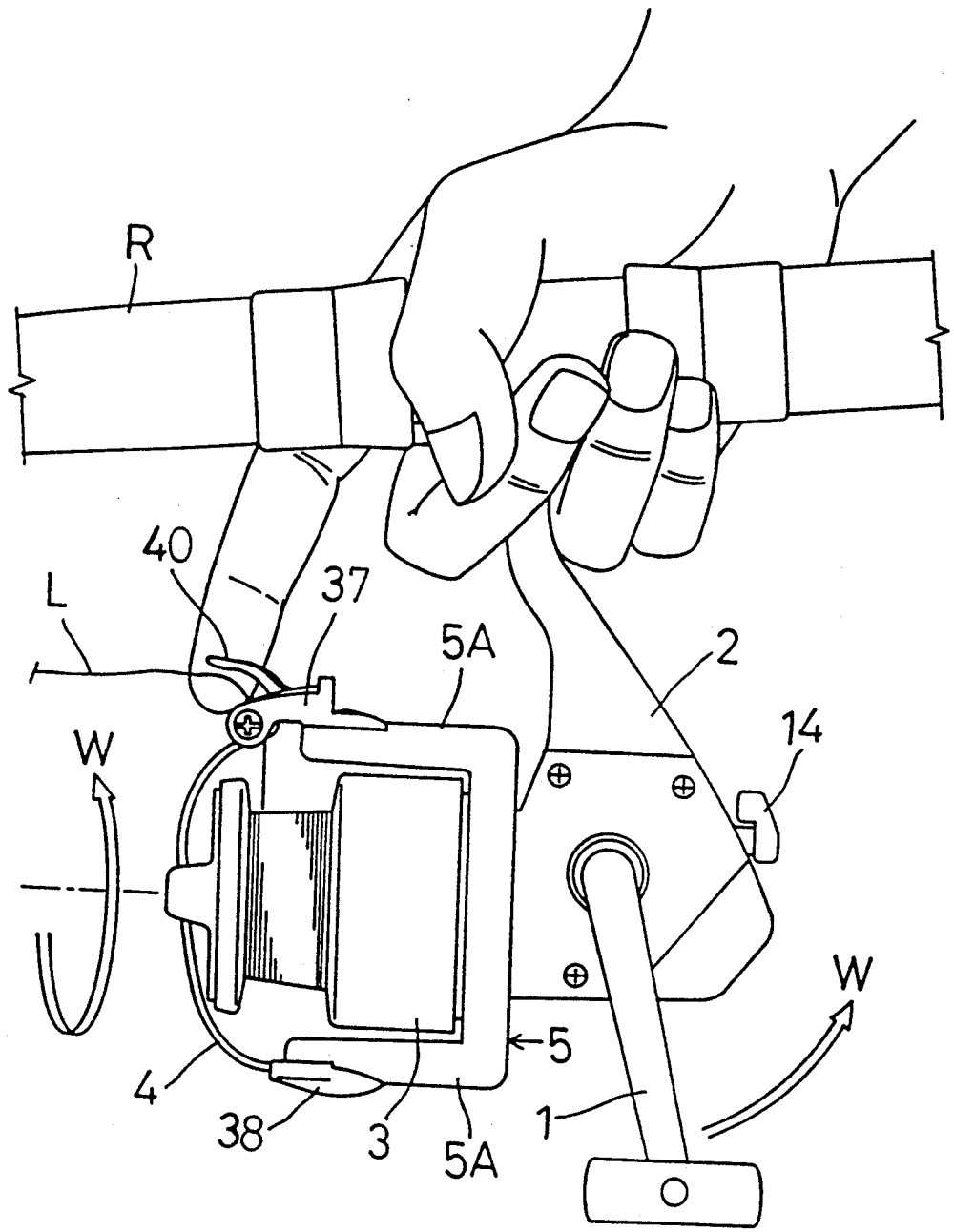
FIG. 23 is a side view showing an angler's finger contacting the controller in the embodiment shown in FIG. 20.
Figure 24:
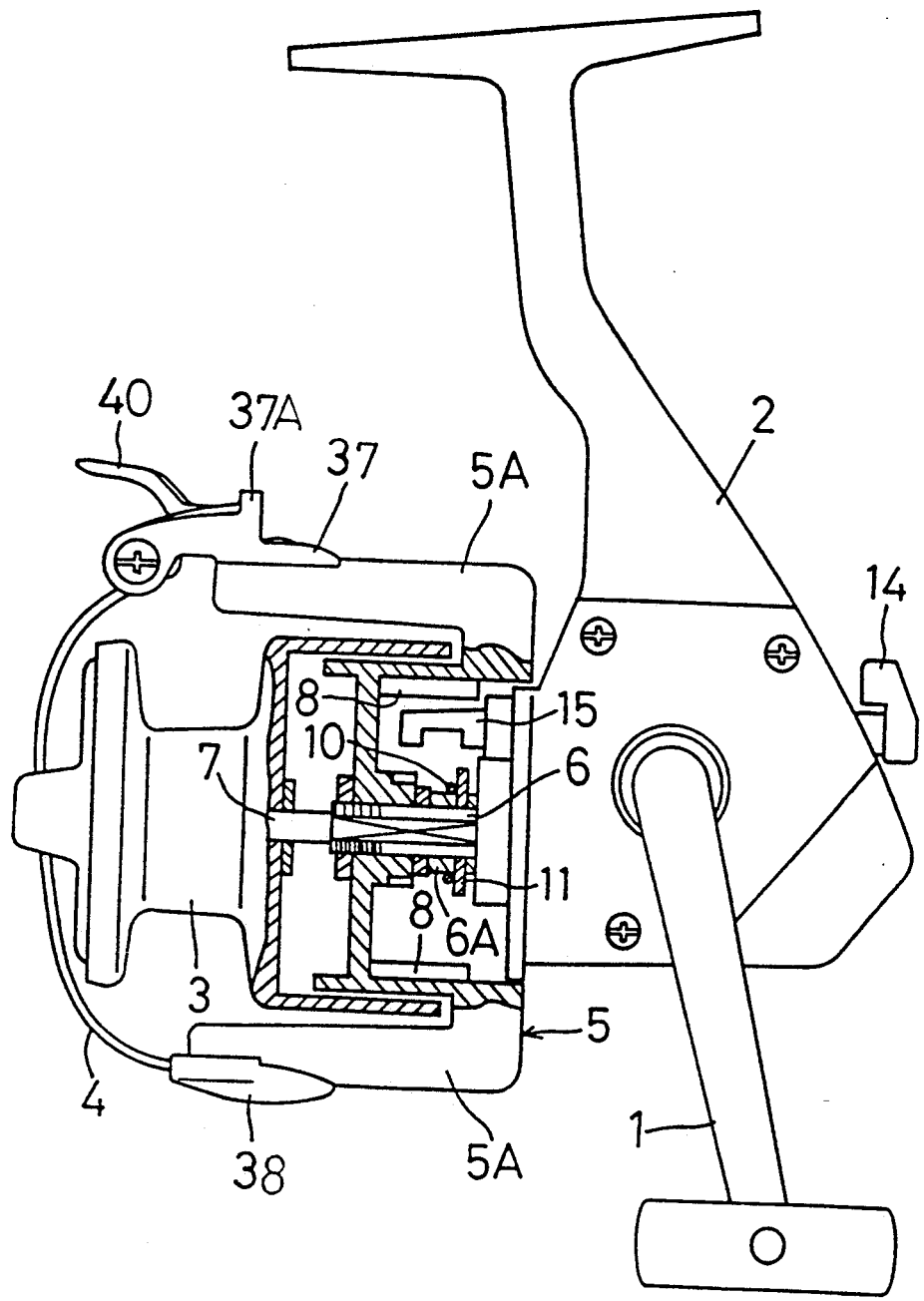
FIG. 24 is a side view, partly in section, of a spinning reel in the embodiment shown in FIG. 20.

As shown in FIGS. 23 and 24, a spinning reel includes a handle 1 attached to a reel body 2, a spool 3 connected to a forward portion of the reel body 2 for winding a fishing line L, and a rotor 5 carrying a bail arm 4 and mounted on the forward portion of the reel body 2.

Drive is transmitted from the handle 1 to the rotor 5 through a tubular drive shaft 6. The drive shaft 6 surrounds a spool shaft 7 supporting the spool 3 on a forward region thereof.

Figure 20:
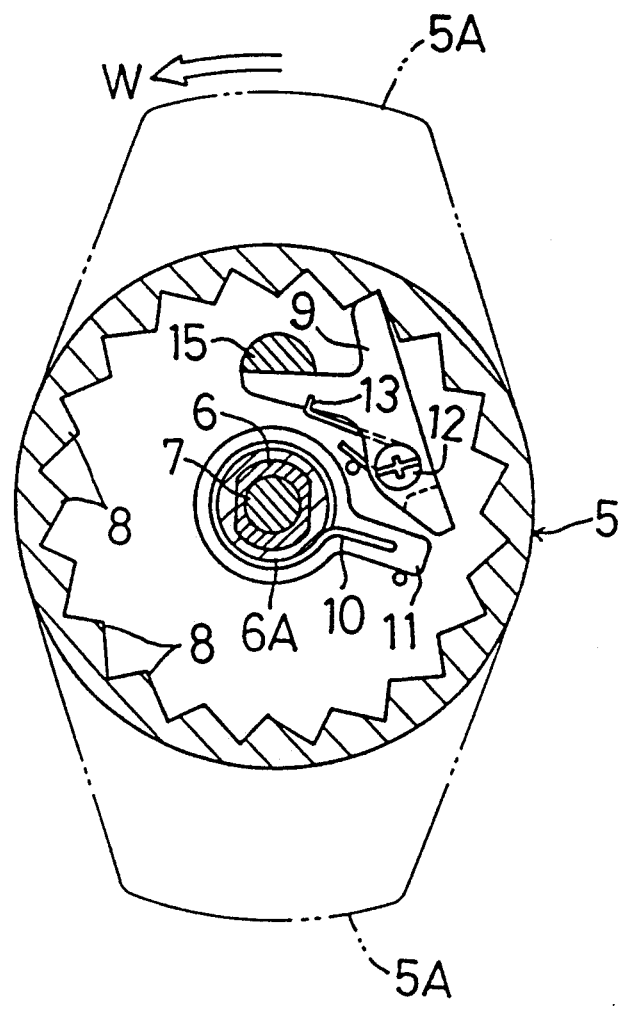
FIG. 20 is a front view of a one-way clutch of a spinning reel in a further embodiment of the invention.
Figure 21:
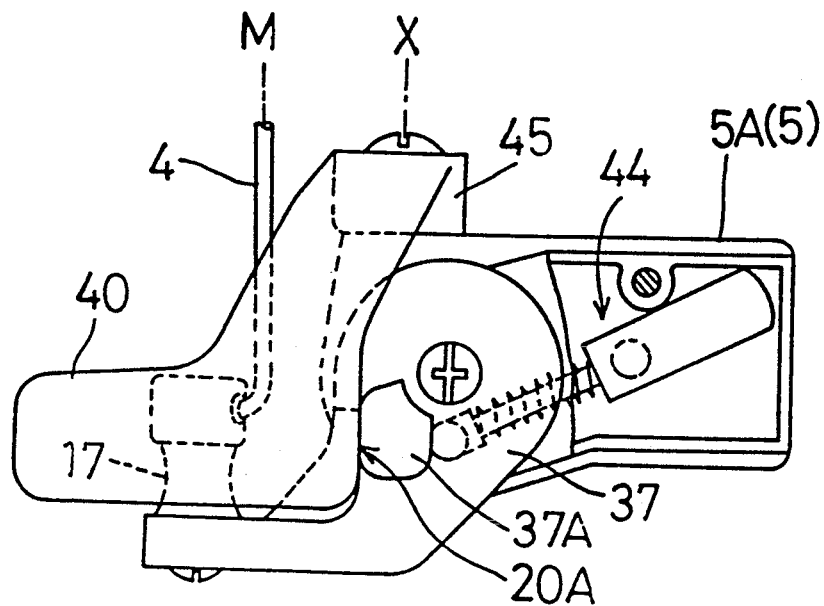
FIG. 21 is a plan view of a controller in a position to set a bail to a winding position in the embodiment shown in FIG. 20.
Figure 22:
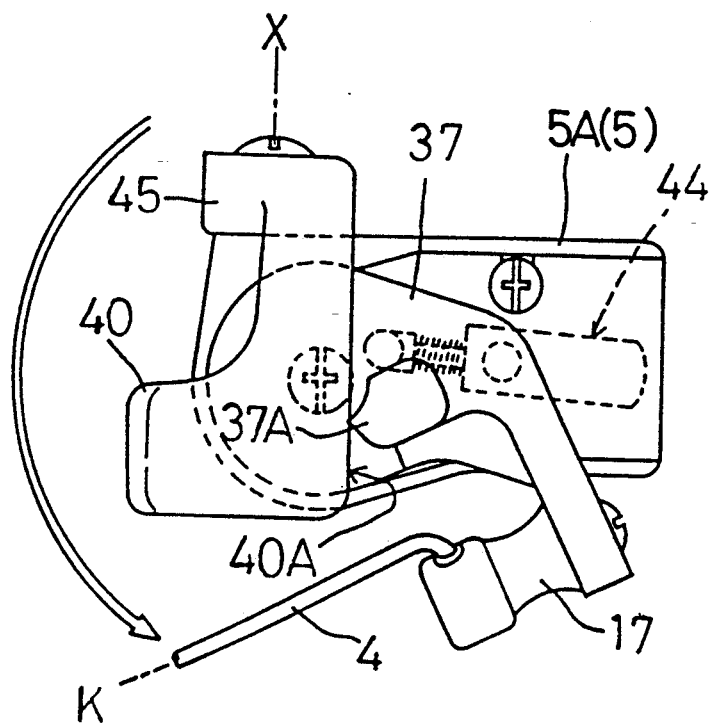
FIG. 22 is a plan view of the controller in a position to set the bail to a release position in the embodiment shown in FIG. 20.

A one-way clutch is provided between the forward portion of the reel body 2 and the rotor 5 for stopping rotation in a line unwinding direction of the rotor 5. As shown in FIG. 20, the clutch includes a plurality of teeth 8 formed on an inner peripheral wall of the rotor 5, a pivotable pawl 9 for engaging the teeth 8, and a cam 11 rotatable by a spring 10 fitted on an outer surface of an element 6A mounted on the drive shaft 6 to be rotatable therewith. The cam 11 acts on the pawl 9 to retract the pawl 9 from the teeth 8 when the drive shaft 6 rotates in a line winding direction, and allows the pawl 9 to engage one of the teeth 8 when the drive shaft 6 rotates in a line unwinding direction.

Figure 25:
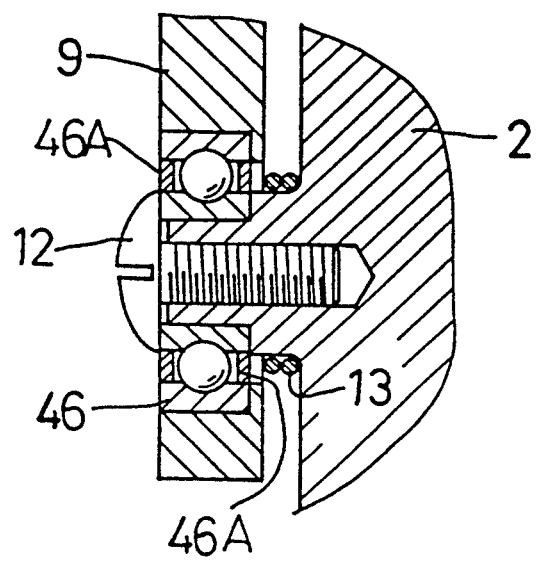
FIG. 25 is a sectional view of a pawl supporting structure in the embodiment shown in FIG. 20.

The pawl 9 is pivotable about a screw acting as a support axis 12 and biased by a spring 13 toward the teeth 8. A stopper 15 is provided to be rotatable through 90 degrees by operating a switch lever 14 attached to the reel body 2. The rotor 5 is prevented from rotating backward when the stopper 15 is set to the position shown in FIG. 20. The rotor 5 may be allowed to rotate backward when the stopper 15 is rotated through 90 degrees from this position. As shown in FIG. 25, the pawl 9 is supported by the support axis 12 through a ball bearing 46 having seals 46A mounted on opposite sides thereof. Thus, the pawl 9 is protected from entry of sand or the like to be smoothly pivotable.

As shown in FIGS. 21 through 25, the bail 4 extends between an arm cam 37 oscillatably supported by one of arms 5A of the rotor 5, and a support arm 38 oscillatably supported by the other arm 5A. Thus, the bail 4 is switchable between a release position K and a winding position M. The arm cam 37 has a line roller 17 for guiding the fishing line L to the spool 3. The arm 5A supporting the arm cam 37 has a leverlike controller 40 for switching the bail 4 to the release position.

The controller 40 is supported by the arm 5A through a support member 45 to be pivotable about an axis X. The controller 40 includes a control surface 40A for contacting a cam portion 47A formed on the arm cam 37. The arm 5A contains a toggle mechanism 44 for maintaining the arm cam 37 in the release position K and winding position M.

As shown in FIGS. 20 and 23, when the handle 1 is turned to wind the fishing line L, the rotor 5 is rotated by a drive system in the direction of arrow W which is opposite to the case of fishing reels commercially available today. For switching the bail 4 to the release position, the angler turns the switch lever 14 to operate the one-way clutch, extends the first finger of the right hand holding a fishing rod R to a position adjacent the controller 40, and turns the handle 1 slightly to rotate the rotor 5 until the controller 40 contacts the first finger. In this state, the angler pulls up the controller 40 with the finger hooking the fishing line L guided by the roller 17. The one-way clutch prevents rotation of the rotor 5 against the force of the finger to stabilize the controller 40, and the fishing line L is held between the tip of the finger and the fishing rod R the moment the bail 4 is switched to the release position.

Figure 26:
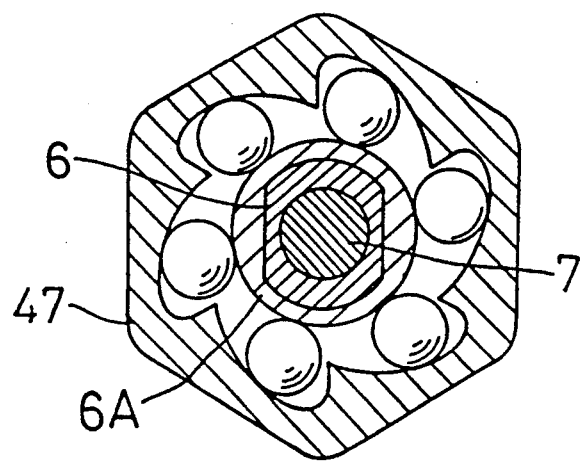
FIG. 26 is a sectional view of a one-way clutch in a still further embodiment of the invention.

FIG. 26 shows a modified one-way clutch 47 which may be a roller type or ball type clutch for allowing rotation only in the line winding direction of the rotor drive shaft 6. This one-way clutch 47 has an outer race fixed to the reel body.

According to the present invention, the rotor 5 may be rotatable in either direction, and the controller for switching the bail to the release position is variable in many ways.

What is claimed is:

1. A spinning reel comprising:
   a reel body;
   a rotor rotatably supported forwardly of said reel body;
   a one-way clutch mechanism for restricting a rotation of said rotor in a line releasing direction, said one-way clutch mechanism including:
   a plurality of teeth formed on an interior surface of said rotor,
   a plurality of teeth formed on an interior surface of said rotor,
   a pawl member pivotably supported on said reel body such that said pawl member is capable of pivoting about an axis having a direction along a rotational axis of said rotor, said pawl member having an engageable portion extending from said axis to said plurality of teeth, said pawl member having a controllable portion extending from said axis in a substantially opposite direction to said engageable portion, said pawl member being pivotable between a first position in which said engageable portion is engaged with one of said plurality of teeth and a second position in which said engageable portion is disengaged;
   an urging means for applying an urging force urging said pawl member to said first position,
   a position switching mechanism, said position switching mechanism including a cam member to pivot toward said pawl member to act on said controllable portion of said pawl member so as to move said pawl member to said second position resisting said urging force when said rotor rotates in a line-winding direction.

2. A spinning reel as claimed in claim 1, wherein said reel body includes a lid removably mounted laterally thereof, and an oscillating mechanism for axially reciprocating a spool through a predetermined range of strokes with rotation of said rotor, said oscillating mechanism including a spool driving screw shaft mounted in said reel body and extending in a fore and aft direction of said reel body, said pawl being supported on a front wall of said reel body through a support axis extending in the fore and aft direction of said reel body.

3. A spinning reel as claimed in claim 2, wherein said screw shaft is disposed in a position corresponding to one of an upper half and a lower half of said front wall of said reel body, and said support axis of said pawl is disposed in a position on said front wall opposite from said lid and in one of the upper half and lower half of said front wall remote from said screw shaft.

4. A spinning reel as claimed in claim 1, wherein said rotor includes a pair of arms, one of which oscillatably supports an arm cam having a fishing line guide, and the other oscillatably supports a support arm, said arm cam and said support arm supporting a bail to be switchable between a release position and a winding position, wherein said arm supporting said arm cam includes a controller for switching said bail to said release position, and wherein said one-way clutch is provided for stopping rotation in the line unwinding direction of said rotor, said rotor being stopped by said one-way clutch within a 30 degrees rotation.

5. A spinning reel as claimed in claim 4, wherein said one-way clutch includes teeth, and a pawl for engaging said teeth to stop rotation in the line unwinding direction of said rotor.

6. A spinning reel as claimed in claim 4, wherein said rotor is rotatable counterclockwise as seen from a forward direction of said rotor when a handle is turned to wind a fishing line.

7. A spinning reel as claimed in claim 4, wherein said one-way clutch is a roller type one-way clutch for stopping rotation in the line unwinding direction of a shaft interlocked to said rotor.

8. A spinning reel as claimed in claim 1, further comprising a stopper element defined on said reel body, said pawl member including an operable portion, wherein said stopper element is capable of being pivoted by an operation from an exterior portion of said reel body to act on said operable portion of said pawl member so as to move said pawl member to said second position regardless of the rotational direction of said rotor.

9. A spinning reel as claimed in claim 1, wherein said cam member is rotatably mounted on a drive shaft member integrally mounted on a drive shaft of said rotor, and said position switching mechanism comprises a spring member mounted on and in contact with said drive shaft member and integrally rotatable with said cam member, said spring member being pivotable in a predetermined angular range by said contact with said drive shaft member to move said pawl member to said second position.

10. A spinning reel as claimed in claim 1, wherein the number of teeth included in said plurality of teeth is larger than 18 and smaller than 28.

11. A spinning reel as claimed in claim 1, wherein said rotor is substantially made of a resin material and a portion of said plurality of teeth is replaced by metal teeth to balance the rotation of said rotor.

12. A spinning reel comprising:
a bail;
a rotor supporting said bail and defining a plurality of teeth on an inner peripheral wall thereof;
a pawl supported in a forward position of a reel body for engaging said teeth; and
a position switching mechanism operable in response to drive in a line winding direction of a drive system for retracting said pawl from said teeth, and in response to drive in a line unwinding direction of said drive system for allowing said pawl to engage one of said teeth, wherein said plurality of teeth and said pawl constitute a one-way clutch, wherein said one-way clutch includes control means for retracting said pawl from said teeth when said rotor rotates in the line winding direction, and allowing said pawl to engage one of said teeth when said rotor rotates in the line unwinding direction, wherein said one-way clutch further includes a stopper for contacting said pawl to hold said pawl out of engagement with said teeth, thereby allowing free rotation in the line unwinding direction of said rotor, and wherein said rotor is formed of a plastic and includes a metal forming part of said teeth for balance of rotation.

13. A spinning reel as claimed in claim 12, wherein said control means has a spring fitted on an element rotatable with a drive shaft for directly controlling the position of said pawl.

14. A spinning reel as claimed in claim 12, wherein the number of said plurality of teeth is in a range from about 18 to about 28 teeth.

15. A spinning reel comprising:
a bail;
a rotor supporting said bail and defining a plurality of teeth on an inner peripheral wall thereof;
a pawl supported in a forward position of a reel body for engaging said teeth;
a spring for biasing said pawl toward said teeth;
a position switching mechanism operable in response to drive in a line winding direction of a drive system for retracting said pawl from said teeth, and in response to drive in a line unwinding direction of said drive system for allowing said pawl to engage one of said teeth;

said position switching mechanism comprising;
a cam switchable between a rotation allowing position for contacting said pawl to disengage said pawl from said teeth, and a rotation stopping position for allowing said pawl to engage one of said teeth, and frictional control means disposed between said cam and said drive system for switching said cam to said rotation allowing position when said rotor rotates in said line winding direction, and to said rotation stopping position when said rotor rotates in said line unwinding direction, said spring having a biasing force weaker than an operating force of said frictional control means occurring when said rotor rotates in said line winding direction, and stronger than a position retaining force of said frictional control means occurring when said rotor stops rotating in said line winding direction.

16. A spinning reel as claimed in claim 15, wherein said frictional control means includes a spring having one end thereof fitted on an a rotatable element, and the other end connected to said cam.

17. A spinning reel comprising:
a reel body;
a rotor rotatably supported forwardly of said reel body;
a one-way clutch mechanism for restricting a rotation of said rotor in a line releasing direction, said one-way clutch mechanism including:
a plurality of teeth formed on an interior surface or said rotor,
a pawl member pivotably supported on said reel body such that said pawl member is capable of pivoting about a pivotal axis, said pivotal axis having a direction along a rotational axis of said rotor, said pawl member having an engageable portion extending from said pivotal axis to said plurality of teeth, a controllable portion extending from said pivotable axis in a substantially opposite direction to said engageable portion and an operable portion, said pawl member being pivotable between a first position in which said engageable portion is engaged with one of said plurality of teeth and a second position in which said engageable portion is disengaged;
a position switching mechanism for switching said pawl member to said second position when said rotor rotates in a line-winding direction and to said first position when said rotor rotates in said line-releasing direction; and
a stopper element defined on said reel body, said stopper element being pivotable by an operation from an exterior portion of said reel body to act on said operable portion of said pawl member so as to move said pawl member to said second position regardless of the rotational direction of said rotor.

18. A spinning reel as claimed in claim 17 wherein said position switching mechanism comprises a spring member with one end thereof mounted on a member integrally rotatable with a driving shaft of said rotor in a contacting manner, and another end fixed on said pawl member.

* * * * *